(12) United States Patent
Konishi et al.

(10) Patent No.: US 8,674,838 B2
(45) Date of Patent: Mar. 18, 2014

(54) WALKING ASSIST DEVICE

(75) Inventors: Kenta Konishi, Nishikamo-gun (JP);
Hironao Hayashi, Motosu-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 232 days.

(21) Appl. No.: 13/126,031

(22) PCT Filed: Oct. 22, 2009

(86) PCT No.: PCT/JP2009/068163
§ 371 (c)(1),
(2), (4) Date: Apr. 26, 2011

(87) PCT Pub. No.: WO2010/050396
PCT Pub. Date: May 6, 2010

(65) Prior Publication Data
US 2011/0205067 A1    Aug. 25, 2011

(30) Foreign Application Priority Data

Oct. 28, 2008    (JP) .................................. 2008-276309

(51) Int. Cl.
*A61B 5/103*    (2006.01)
*G08B 23/00*    (2006.01)
*G08B 1/08*    (2006.01)
*A61F 2/74*    (2006.01)
*A61F 2/60*    (2006.01)

(52) U.S. Cl.
USPC ................ 340/573.1; 340/573.7; 340/539.12; 600/595; 623/27; 623/28

(58) Field of Classification Search
None
See application file for complete search history.

(56) References Cited

U.S. PATENT DOCUMENTS 6,424,868 B1 *   7/2002   Smith et al. ...................... 607/59
7,641,700 B2 *   1/2010   Yasui ............................... 623/40
(Continued)

FOREIGN PATENT DOCUMENTS

JP    4-133832 U    12/1992
JP    6-296705 A    10/1994
(Continued)

OTHER PUBLICATIONS

Japanese Office Action mailed Dec. 1, 2009 of JP 2008-276309.
(Continued)

*Primary Examiner* — George Bugg
*Assistant Examiner* — Renee Dorsey
(74) *Attorney, Agent, or Firm* — Kenyon & Kenyon LLP

(57) ABSTRACT

A walking assist device which allays uneasiness felt by a user when a wearable device actively applies torque to a leg. A walking assist device comprises a controller, a headphone and a wearable device attached to left and right legs. The wearable device has a sensor that detects motion of the user's leg and a motor that applies torque to a joint of the user's leg. The controller controls the wearable device such that the joint angle of the user follows a target pattern which represents time-dependent changes of a target joint angle. The controller specifies a change timing at which a time-dependent change of the target joint angle in the target pattern meets a predetermined condition, and informs the user, before the specified change timing, that the change timing is arriving. The uneasiness felt by the user when an actuator actively applies torque to the leg joint is allayed by informing the user of the motion before the actuator performs that motion.

6 Claims, 7 Drawing Sheets

(56) References Cited

U.S. PATENT DOCUMENTS

| | | | |
|---|---|---|---|
| 8,147,436 B2* | 4/2012 | Agrawal et al. | 602/16 |
| 2004/0176226 A1* | 9/2004 | Carlson | 482/112 |
| 2006/0260620 A1* | 11/2006 | Kazerooni et al. | 128/845 |
| 2006/0276728 A1* | 12/2006 | Ashihara et al. | 601/5 |
| 2008/0154165 A1 | 6/2008 | Ashihara et al. | |
| 2009/0270766 A1 | 10/2009 | Yasuhara | |
| 2009/0276058 A1 | 11/2009 | Ueda et al. | |
| 2009/0306548 A1* | 12/2009 | Bhugra et al. | 600/587 |
| 2010/0049333 A1* | 2/2010 | Endo et al. | 623/27 |
| 2010/0094188 A1* | 4/2010 | Goffer et al. | 602/23 |

FOREIGN PATENT DOCUMENTS

| | | |
|---|---|---|
| JP | 2002-345907 A | 12/2002 |
| JP | 2004-504922 A | 2/2004 |
| JP | 2004-267624 A | 9/2004 |
| JP | 2005-006751 A | 1/2005 |
| JP | 2005-211328 A | 8/2005 |
| JP | 2006-102156 A | 4/2006 |
| JP | 2006-187348 A | 7/2006 |
| JP | 2006-314670 A | 11/2006 |
| JP | 2006-334200 A | 12/2006 |
| JP | 2007-061527 A | 3/2007 |
| JP | 2007-130172 A | 5/2007 |
| JP | 2007-130234 A | 5/2007 |
| JP | 2007-520309 A | 7/2007 |
| JP | 2008-012358 A | 1/2008 |
| WO | 2002/013695 A1 | 2/2002 |
| WO | 2005/086574 A1 | 9/2005 |
| WO | 2006/038712 A1 | 4/2006 |

OTHER PUBLICATIONS

International Search Report.
Written Opinion of the International Searching Authority.
International Preliminary Examination Report of PCT/JP2009/068163 and English translation thereof.

* cited by examiner

WALKING ASSIST DEVICE

This is a 371 national phase application of PCT/JP2009/068163 filed 22 Oct. 2009, claiming priority to Japanese Patent Application No. JP 2008-276309 filed 28 Oct. 2008, the contents of which are incorporated herein by reference.

TECHNICAL FIELD

This application claims priority to Japanese Patent Application No. 2008-276309, filed on Oct. 28, 2008, the contents of which are hereby incorporated by reference into the present application. The present invention relates to a walking assist device which assists the walking of a user. In particular, the present application relates to a walking assist device which assists the walking of a user who can move one leg normally but cannot move the other leg normally.

BACKGROUND ART

Walking assist devices are being researched which assist the walking of a user by actively applying torque to a joint of a leg, thereby adjusting an angle of the leg. For example, Patent Document 1 discloses a walking assist device worn by a user who cannot move one leg well, which applies torque to a joint of the unhealthy leg based on a motion of a healthy leg.
[Patent Document 1] Japanese Patent Application No. 2006-314670

SUMMARY OF INVENTION

Technical Problem

Because the walking assist device of Patent Document 1 actively applies torque to the unhealthy leg, the user may feel uneasiness. This is because the user cannot predict how the walking assist device will move the unhealthy leg. The present invention provides a walking assist device which allays user's uneasiness being felt when the device actively applies torque to the leg.

Solution to Technical Problem

As described above, the user feels uneasiness because the user is unable to properly imagine how the walking assist device will move the leg. To deal with this, the walking assist device of the present invention shows the user, prior to applying torque to the leg, an image, sound, or tactile stimulation which helps the user predict the motion of the device. The "image, sound, or tactile stimulation which helps the user predict the motion of the device" may be called "notifying stimulation" herein after.

The walking assist device based on the technique taught in the present specification comprises a wearable device attached to a leg of the user, and a controller configured to control the wearable device. The wearable device applies torque to a joint of the user's leg and, thus, adjusts the joint angle. The controller is configured to control the wearable device such that the joint angle of the user follows a target pattern which represents time-dependent changes of a target joint angle for the joint to be adjusted. The controller is configured to provide the user with the "notifying stimulation" before moving the wearable device based on this target pattern.

The wearable device includes, for example, a two-link mechanism in which an upper link fixed to a thigh and a lower link fixed to a lower leg of the user are connected by a rotating joint positioned at an outer side of a knee, and the rotating joint is driven by an actuator. The wearable device having such mechanism assists motion of the user's knee.

One embodiment of the method for providing "notifying stimulation" is notifying the user in advance a timing at which the target joint angle changes greatly. Consequently, in one embodiment of the technique taught in the present specification, the controller of the walking assist device is configured to perform the following processes. That is, the controller specifies a change timing at which a time-dependent change of the target joint angle in the target pattern meets a predetermined condition. Next, prior to the specified change timing, the controller informs the user that the change timing is arriving. That is, this walking assist device warns the user the timing at which the motion of the wearable device will change. This type of walking assist device can allay the user's uneasiness arising from being unable to imagine the next motion of the wearable device.

The most preferred "predetermined condition" is a timing at which the target pattern reaches at least one of either a local minimum value or local maximum value. In other words, such a timing corresponds to a timing at which a trajectory of the target joint angle reaches the local minimum or maximum value on a time axis. This timing corresponds to a timing at which a rotation direction of the joint (rotation direction of the target joint angle) is reversed. The controller specifies, as the change timing, the timing at which the target pattern reaches at least one of either the local minimum value or the local maximum value. By being notified such change timing in advance, the user is able to know, in advance, when the rotation direction of the torque that the wearable device applies to the joint is reversed. The user receiving this type of notification can feel more comfortable. Since knee motion is important in walking, it is preferred that the joint to which the wearable device applies torque is the knee joint.

Other examples of "predetermined conditions" may be a motion start timing or stop timing of the wearable device. Mathematically, these are timings satisfying a condition that the time-dependent changes of the target pattern are discontinuous.

The target pattern stored in the controller may be prepared in advance, or may be generated in real time as the user walks. The latter case is suitable for a walking assist device for a user having only one unhealthy leg. In this case, the walking assist device may have a leg motion sensor that detects the motion of the one leg. The controller may generate a target pattern of the other leg from the motion of the one leg and may control, in accordance with the generated target pattern, the wearable device which adjusts the joint angle of the other leg.

One other embodiment of the method for applying "notifying stimulation" is to give the user, in advance, notifying stimulation which helps the user imagine the entire time-depending waveform of the target pattern. In one other embodiment of the technique taught in the present specification, the controller of the walking assist device may be configured to perform the following processes. That is, the controller may generate a notification pattern of a waveform corresponding to time-dependent changes of the target pattern. Further, the controller may be configured to provide the user with a stimulation based on the notification pattern before controlling the wearable device in accordance with the target pattern. The waveform of the notification pattern may be homothetic with the waveform of the time-dependent changes of the target pattern.

In this case, the "notifying stimulation" may specifically be sounds having a pattern in which the time-dependent changes in frequency thereof are the same as the waveform of the target pattern. Alternatively, the "notifying stimulation" may be a vibration in which a pattern of the time-dependent changes in vibration frequency is the same as the waveform of the target pattern, and given to the user.

Before the motion of the wearable device, the user is given the notifying stimulation having a waveform resembling the waveform of the target pattern of the mechanical joint of the wearable device. The user can consequently imagine the future motion of the wearable device, i.e., can imagine all the expected time-dependent changes of the joint angle that are realized by the wearable device.

The "notifying stimulation" does not merely provide a walking rhythm, but also notifies the user the motion of the wearable device in advance. According to the technique taught in the present specification, a walker can imagine the motion of the wearable device in advance, and particularly the timing when large changes in the joint angle will occur. The user can allay the sense of insecurity felt with respect to the walking assist device.

DESCRIPTION OF EMBODIMENTS

Figure 1A:
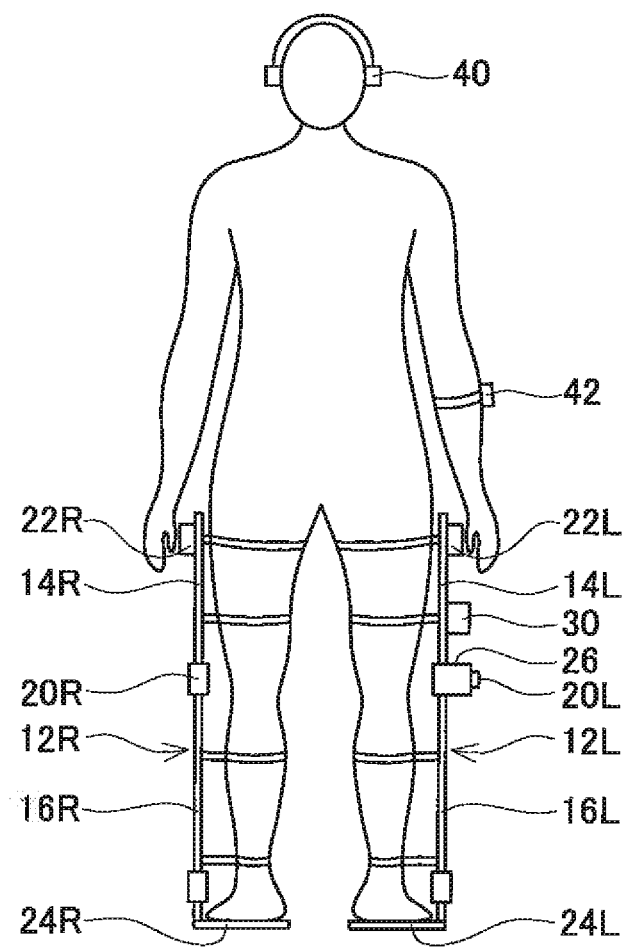
FIG. 1A shows a schematic front view of a walking assist device of an embodiment.
Figure 1B:
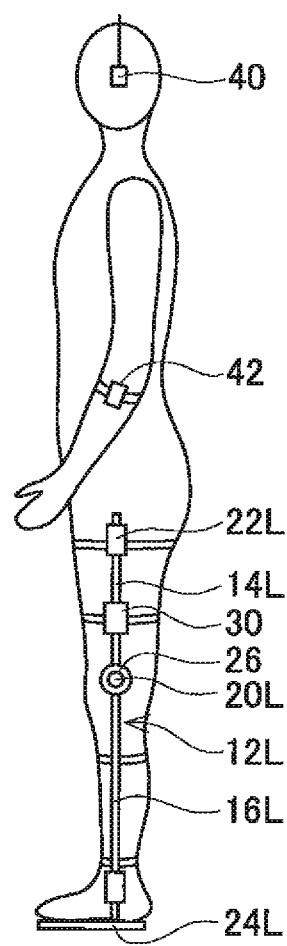
FIG. 1B shows a schematic side view of the walking assist device of the embodiment.

A walking assist device of the embodiment will be described with reference to the drawings. FIG. 1A shows a schematic view of a walking assist device 10 worn by a user. FIG. 1A shows a schematic front view, and FIG. 1B shows a schematic side view. The walking assist device of this embodiment is a device for a user who cannot freely move a knee joint of his/her left leg. The walking assist device 10 applies an appropriate torque to the user's left knee joint, thereby assisting the user's walking motion. Moreover, it should be noted that the technique taught in the present specification is also applicable to a walking assist device which applies torque to a leg joint other than the knee.

The walking assist device 10 includes a right leg device 12R and a left leg device 12L. The right leg device 12R and the left leg device 12L correspond to a wearable device. The right leg device 12R is attached on an outer side of the right leg extending from the thigh to the lower leg of the user. The right leg device 12R includes an upper link 14R and a lower link 16R. The two links are joined rotatably. The upper link 14R is fixed to the user's thigh by a belt. The lower link 16R is fixed to the user's lower leg by a belt. A mechanical joint of the upper link 14R and the lower link 16R is positioned on the outer side of the user's right knee. The mechanical joint rotates the upper link 14R and the lower link 16R relative to one another. The mechanical joint is disposed so that an axis line of the mechanical joint is positioned to be approximately coaxial with an axis line of the user's knee joint. An encoder 20R is provided in the mechanical joint. The encoder 20R detects an angle of the user's right knee joint.

An inclination angle sensor 22R is attached to the upper link 14R. The inclination angle sensor 22R detects the angle, around the pitch axis, of the user's right hip joint. A ground contact sensor 24R is attached to a lower end of the lower link 16R. The ground contact sensor 24R detects a ground leaving timing and ground contacting timing of the right leg.

The left leg device 12L is worn on an outer side of the left leg along from the user's thigh to lower leg. The left leg device 12L includes substantially the same configuration as the right leg device 12R. That is, the left leg device 12L includes an upper link 14L and a lower link 16L. The two links are rotatably connected on an outer side of the left knee. The left leg device 12L includes an encoder 20L, inclination angle sensor 22L, and ground contact sensor 24L. The encoder 20L detects the angle of the user's left knee joint, and the inclination angle sensor 22L detects the angle of the user's left hip joint. The knee joint angle and hip joint angle mean the angle of rotation around the pitch axis. The pitch axis corresponds to an axis extending in a lateral direction of the user. The ground contact sensor 24L detects a ground leaving timing and ground contacting timing of the user's left leg.

The left leg device 12L further comprises a motor 26 and a controller 30. The motor 26 is provided on a mechanical joint which joins the upper link 14L and lower link 16L, and is positioned on an outer side of the user's left knee joint. The motor 26 can rotate the lower link 16L with respect to the upper link 14L. That is, the motor 26 can apply torque to the user's left knee joint. The controller 30 controls the motor 26 based on the output of the sensors. In other words, using the motor 26, the left leg device 12L adjusts the angle of the user's left knee joint by applying torque thereto.

As described above, the walking assist device 10 is worn along from the user's thigh to lower leg. The walking assist device 10 comprises the motor 26 that adjusts the angle of the user's left knee joint by applying torque thereto, and the sensors 20R, 22R, 24R, 20L, 22L, 24L that detect the motion of both legs of the user. The sensors 20R, 22R, 24R attached to the right leg may be collectively termed "leg motion sensors." hereinafter.

The walking assist device 10 further comprises a headphone 40 and an arm motion sensor 42. The arm motion sensor 42 is an acceleration sensor. The arm motion sensor 42 is attached to the user's left arm, and detects a number of times the left arm has been swung and a swinging speed thereof. An output of the arm motion sensor 42 is sent to the controller 30.

The headphone 40 converts electrical signals sent from the controller 30 into sound, and provides the signals sent from the controller 30 to the user.

Figure 2:
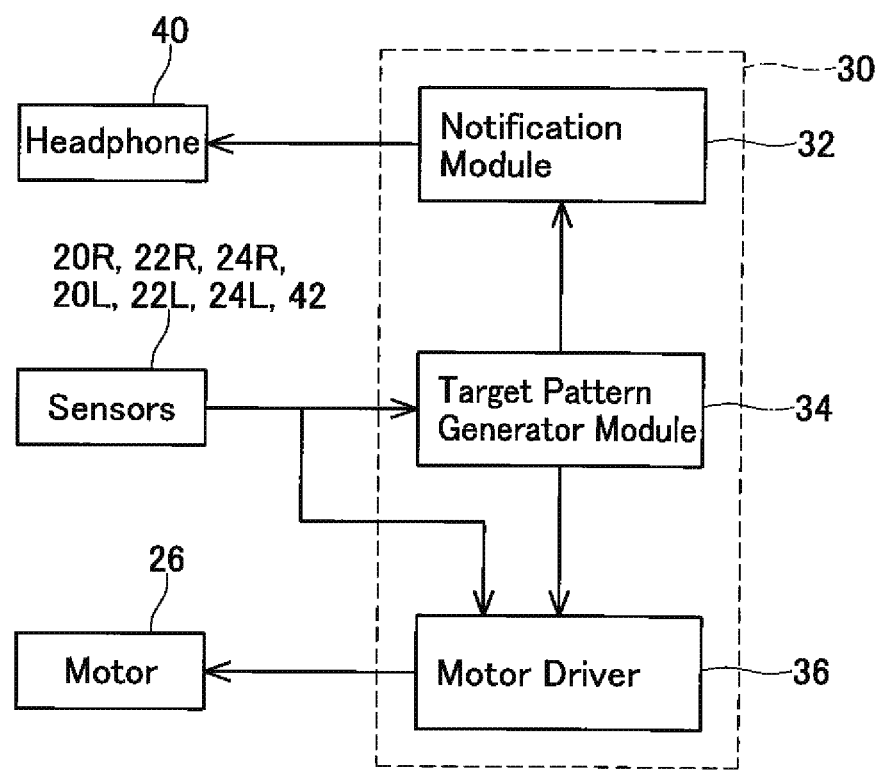
FIG. 2. shows a block diagram of a controller.

Functions of the controller 30 will be outlined. A block diagram of an interior of the controller 30 is shown in FIG. 2. The controller 30 comprises a target pattern generator module 34, a notification module 32, and a motor driver 36. The modules 32, 34, and 36 correspond to a CPU of the controller 30 as hardware, and commands executed by the CPU are described in programs stored in the controller 30.

Based on signals from the leg motion sensors (the sensors attached to the right leg), the target pattern generator module 34 acquires the time-dependent changes of the knee joint angle of the right leg during a one step motion period. The "one step motion period" corresponds to a period from a ground leaving timing of the right leg to its next ground leaving timing. Moreover, the controller 30 determines the ground leaving timing based on signals of the ground contact sensor 24R attached to the right leg.

Figure 3:
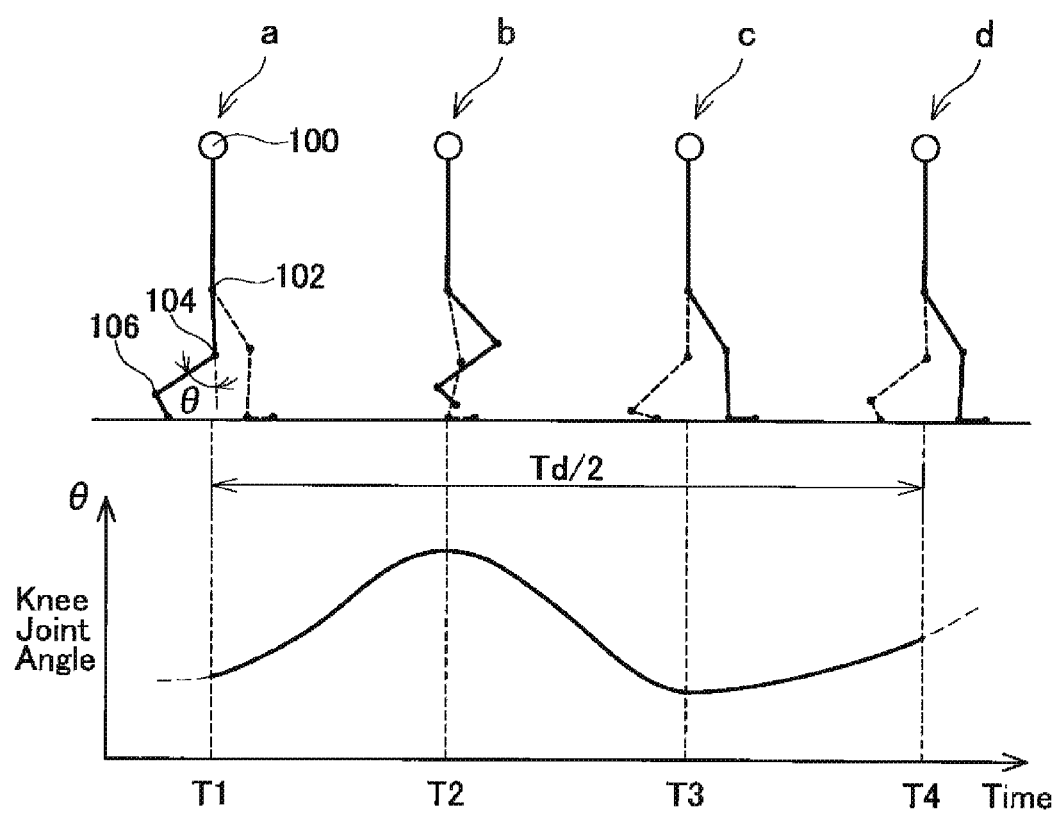
FIG. 3 illustrates a target pattern.

A change pattern of the knee joint angle will be described with reference to FIG. 3. FIG. 3 shows the walking motion of a half cycle (from the right leg leaving the ground to the left leg leaving the ground). In addition, in FIG. 3, the time of one cycle is shown by letters Td. The solid line represents the right leg, and the broken line represents the left leg. The letter "a"

of FIG. 3 represents leg configuration at the timing of leaving the ground of the right leg. The letter "b" of FIG. 3 represents leg configuration at the timing at which the knee joint of the right leg is most bent where the right leg has left the ground. The letter "c" of FIG. 3 represents leg configuration at the timing of reaching the ground of the right leg. The letter "d" of FIG. 3 represents leg configuration at the timing of leaving the ground of the left leg. FIG. 3 represents time elapsing from "a" toward "d". In addition, the numerals 102, 104, 106 in FIG. 3 represent the hip joint, knee joint, and ankle joint of the right leg respectively. The graph drawn at the lower side of FIG. 3 represents time-dependent changes of a joint angle θ of the right knee. In FIG. 3, the symbols T1, T2, T3, and T4 respectively denote the timing when the right foot leaves the ground, the timing when the right knee joint is most flexed, the timing when the right leg reaches the ground, and the timing when the left leg leaves the ground. As shown in the graph of FIG. 3, the pattern of time-dependent changes of the right knee joint angle has its extremums at timings T2 and T3. The timing T2 corresponds to the local maximum value, and the timing T3 corresponds to the local minimum value. Since the latter half of one step cycle can be obtained in the same manner, an explanation thereof is omitted.

The target pattern generator module 34 stores the obtained pattern of time-dependent changes of the right knee joint angle as a target pattern for the left knee joint. The timing at which the controller 30 drives the left leg device 12L in accordance with the target pattern is synchronized with the timing when the left leg leaves the ground. That is, the time-dependent pattern of the right knee joint angle in the period from timing T1 (which corresponds to the timing at which the right leg leaves the ground) to T4 (which corresponds to the timing at which the left leg leaves the ground) is adopted as the target pattern for assisting the left leg, starting from the timing at which the left leg leaves the ground (i.e., timing T4). That is, the controller 30 controls the motor 26 to adjust the left knee joint angle so that the left knee joint angle follows the pattern of time-dependent changes of the right knee joint angle. More specifically, the controller 30 controls the motor 26 such that the rotation angle of the upper link 14L and lower link 16L follows the pattern of time-dependent changes of the right knee joint angle. It should be noted that the rotation angle of the upper link 14L and lower link 16L represents the joint angle of the user's left knee.

The explanation will be continued with reference to FIG. 2. The generated target pattern is sent to the motor driver 36. Signals from a sensor attached to the left leg are input to the motor driver 36. The motor driver 36 can specify the ground leaving timing T4 of the left leg based on the signal of the ground contact sensor 24L of the left leg. From this timing T4, the motor driver 36 starts controlling the motor based on the target pattern.

The target pattern is also sent from the target pattern generator module to the notification module 32. Timing detection conditions have been stored in advance in the notification module 32. These timing detection conditions specify the timing at which the waveform of the target pattern reaches the extremum value (local maximum value or local minimum value), and the start timing of the target pattern. In the example of FIG. 3, timing T1 (start timing), timing T2 (timing of reaching the local maximum value), and timing T3 (timing of reaching the local minimum value) are specified. Moreover, in the notification module 32, timings T2 and T3 are specified as the lapse time elapsed from the start timing T1 on the target pattern. These timings correspond to change timings at which the waveform of the target pattern changes greatly. More precisely, these change timings correspond to timings at which the rotation direction of the target joint angle (changes of direction over time) is reversed.

The notification module 32 operates in synchrony with the motor driver 36. While the motor driver 36 is controlling the motor 26 in accordance with the target pattern, the notification module 32 outputs, before the specified change timing, a sound via the headphone 40 to announce the arrival of the change timing. The timing (the notification timing) at which the notification module 32 outputs the sound will be explained below with reference to FIG. 4.

Figure 4:
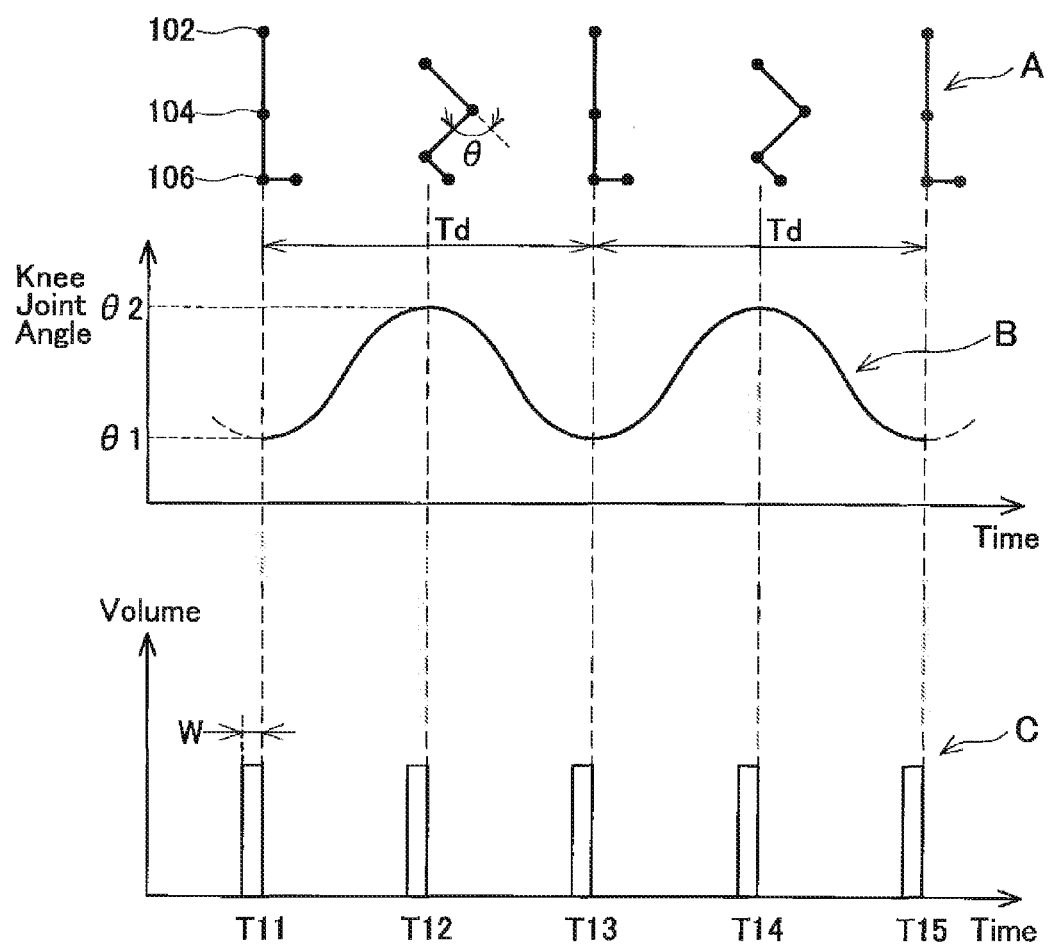
FIG. 4 illustrates notification time.

The letter "B" of FIG. 4 represents a graph (waveform) schematically showing the target pattern of two cycles. The letter "A" of FIG. 4 represents the configurations of the left leg at each change timings. The numerals 102, 104, and 106 in "A" of FIG. 4 represent the hip joint, knee joint, and ankle joint respectively. The letter "C" of FIG. 4 represents the waveform of the sounds that are output. It should be noted that FIG. 4 represents the leg motion schematically, and does not represent the actual time-dependent changes of the knee joint angle accurately.

Timing T11 represents the start timing of the first cycle. Timing T11 also represents the timing at which the knee joint angle reaches its local minimum value θ1. Timing T12 represents the timing at which the knee joint angle reaches its local maximum value θ2 in the first cycle. Timing T13 represents the start timing of the second cycle. Timing T13 also represents the timing at which the knee joint angle reaches its local minimum value θ1. Timing T14 represents the timing at which the knee joint angle reaches its local maximum value θ2 in the second cycle. Timing T15 represents the start timing of the third cycle. The notification module specifies these timings from the target pattern. The controller 30 thus specifies, as the change timing, the timing at which at least one of the local minimum value or local maximum value is reached in the target pattern. Meanwhile, the motor driver 36 controls the motor 26 such that the joint angle of the left knee follows the target pattern.

As the graph of "C" in FIG. 4 shows, the notification module 32 outputs a sound from the headphone 40 at a notification timing which precedes the specified timing by a period W. That is, the specified change timing will come immediately after the notification module 32 has output the sound. In other words, before the motor is controlled at the specified change timing, the notification module 32 notifies the user that the change time is arriving.

The advantages of outputting the sound in FIG. 4 "C" will be described. The walking assist device 10 outputs the sound at a timing which precedes timing T11 by the period W. Timing T11 corresponds to the motion start timing which is one of the change timings. The user who has heard this sound knows that the motor 26 of the walking assist device 10 is about to start driving. The walking assist device 10 outputs the sound at the notification timing which precedes timing T12 by the period W. Timing T12 corresponds to the timing at which the knee joint angle reaches its local maximum. This timing is one of the change timings. The user who has heard this sound knows that the motor 26 is about to start reversing. As described above, the user of the walking assist device 10 can thus know, before the device drives, the timings at which the driving pattern is greatly changed. Consequently, the user can imagine in advance how the walking assist device 10 will move the leg, thus decreasing his/her feelings of uneasiness.

Figure 5:
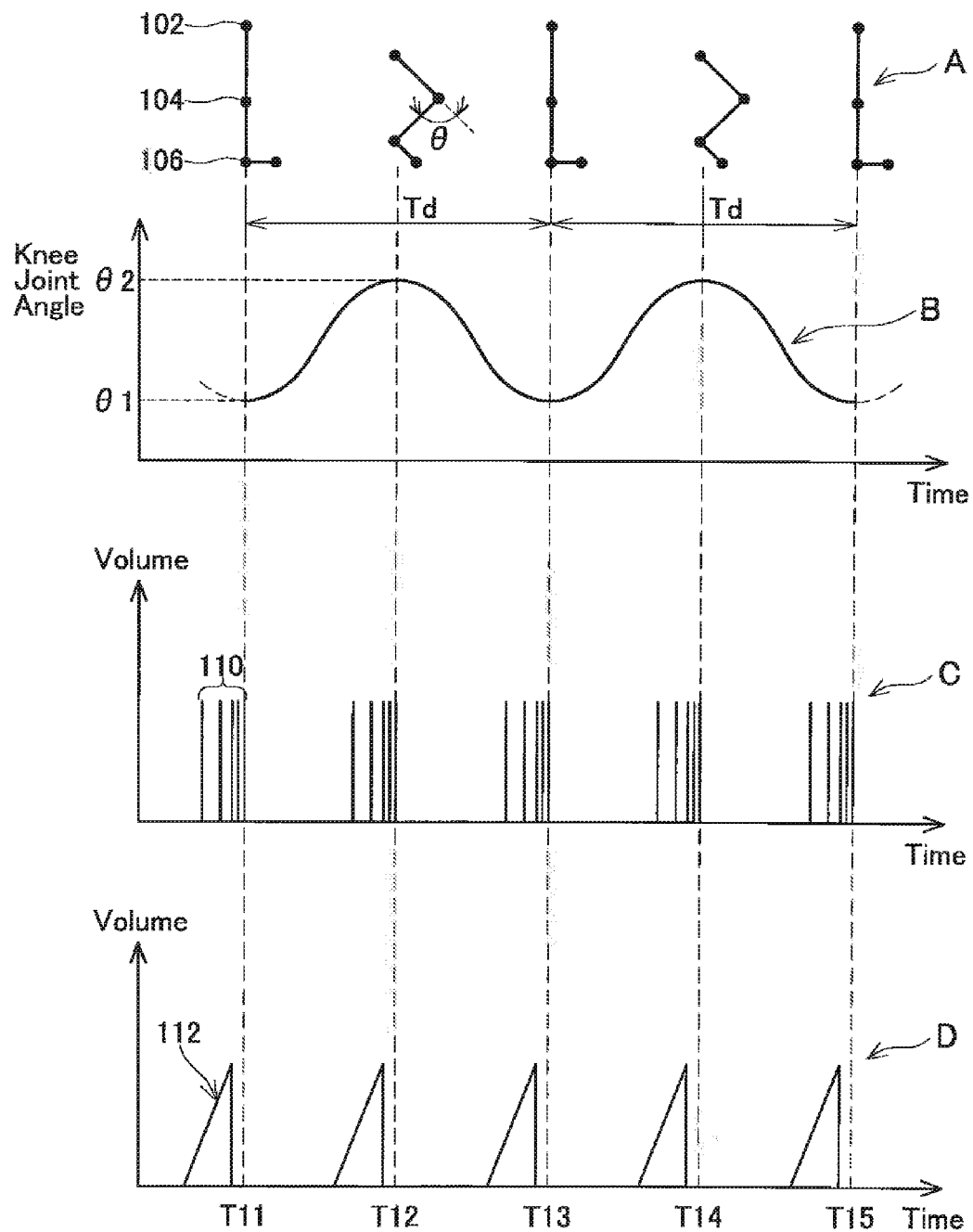
FIG. 5 illustrates variant notification patterns using sound.

The sound pattern notifying arrival of the change timing is not restricted to the pattern of FIG. 4 "C". Modifications of the sound pattern are shown in FIG. 5. The letters "A" and "B" in FIG. 5 are identical to those in FIG. 4. The letter "C" in FIG. 5 represents a first modification. The letter "D" in FIG. 5 represents a second modification. In a sound pulse sequence 110 shown by "C" in FIG. 5, pitch grows shorter as the specified change timing being approached. A sound pulse 112 shown by "D" in FIG. 5 represents the sound volume increasing as the specified change timing being approached. As with the embodiment described above, these modifications can notify the user that the specified change timing is arriving.

The notification timing can also be described differently, as follows. As shown in FIGS. 4, 5, the walking assist device 10 outputs a sound notifying the user the arrival of the next extremum value (change timing) while the target joint angle is increasing or decreasing monotonically. More preferably, the walking assist device 10 outputs a sound notifying the user the arrival of the change timing immediately before the specified change timing arrives.

Next, a second embodiment will be described. The configuration of the walking assist device of this embodiment is identical to that of the previous embodiment. Only the processes in the notification module 32 differ. Therefore, a description of the configuration of the walking assist device of the second embodiment is omitted.

The walking assist device of the present embodiment does not specify the timings which should be notified regarding the target pattern. Instead, the walking assist device generates a sound pattern which has a time-dependent waveform homothetic with the target pattern. This sound pattern may be called a "notification pattern." An example of the notification pattern will be described with reference to FIG. 6.

Figure 6:
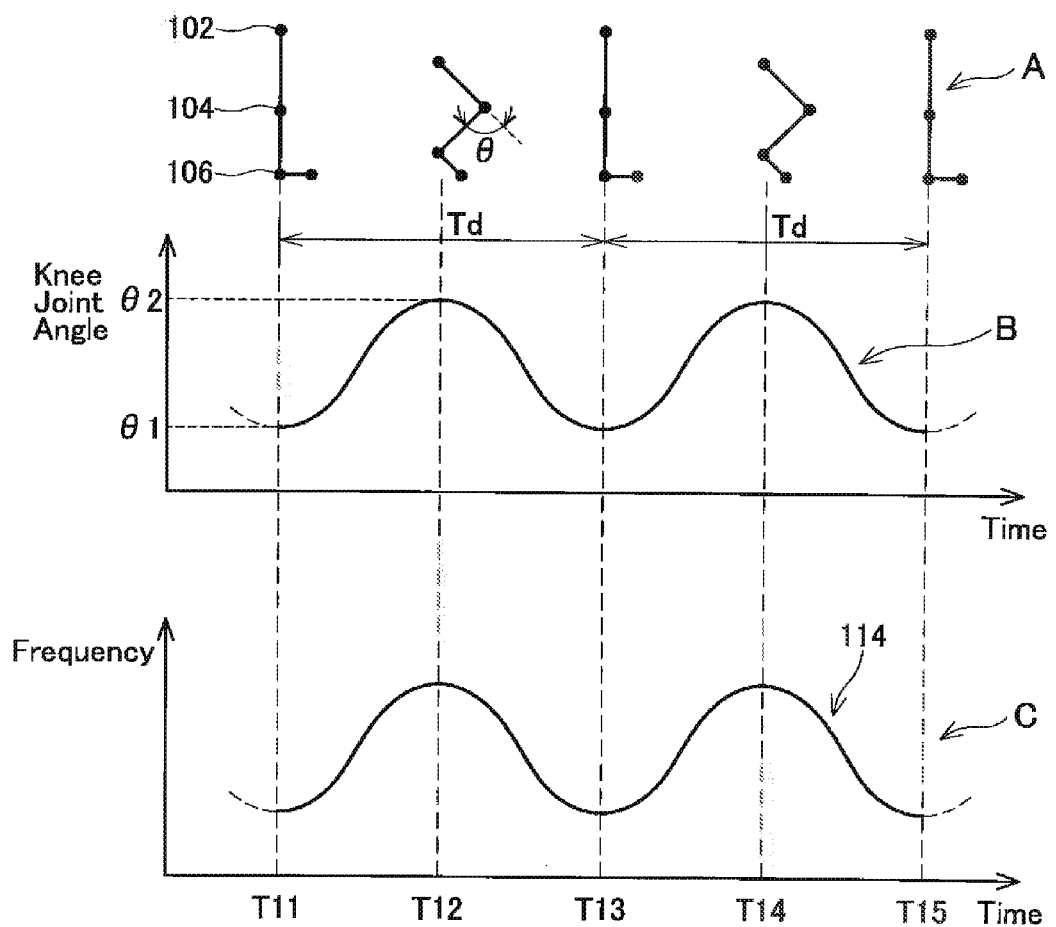
FIG. 6 shows an example of a notification pattern.

The figures denoted by "A" and "B" in FIG. 6 are identical to the figures denoted by "A", "B" in FIG. 5. The letter "C" of FIG. 6 shows a graph 114 of a notification pattern. The graph 114 also represents a waveform of the notification pattern. A vertical axis of the graph shown by "C" in FIG. 6 represents sound frequency. That is, the graph of "C" in FIG. 6 means that, the higher it is on the graph, the higher the tone of the sound. As can be seen from comparing "B" and "C" in FIG. 6, the waveform of the notification pattern is homothetic with the waveform of the target pattern. Before the motor driver 36 drives the motor in accordance with the target pattern, the notification module 32 outputs sound based on the notification pattern. In other words, the walking assist device 10 starts a walking assistance after having output sound based on the notification pattern.

Using the walking assist device 10, the user will hear, prior to the assistance, the sound of the waveform that is homothetic with the waveform of the target pattern. The user can imagine, in advance, the target pattern from the waveform of the sound. I.e., he can imagine in advance how his leg will be moved.

The function of the arm motion sensor 42 of the walking assist device 10 shown in FIG. 1 will be described. The arm motion sensor operates as an HMI (Human Machine Interface). For example, when the arm motion sensor 42 detects two successive arm swings, the walking assist device 10 starts its operation. Further, when the arm motion sensor 42 detects two successive arm swings again, the walking assist device 10 stops its operation. That is, the arm motion sensor 42 acts as a power switch of the walking assist device 10.

Further, the arm motion sensor 42 detects a speed of the arm swing. The controller 30 modifies a target pattern cycle Id in accordance with the speed detected by the arm motion sensor 42. For example, when the user swings his arm quickly, the cycle Td of the target pattern becomes smaller. When the user swings his arm slowly, the cycle Td of the target pattern becomes larger. This type of operation is advantageous for the case of gradually increasing (or decreasing) walking speed. In the case of increasing the walking speed, one step by the unhealthy leg becomes slightly faster than the previous speed of one step by the healthy leg. The function of the arm motion sensor 42 is advantageous when the speeds of the one step by the healthy leg and of the one step by the unhealthy leg differ. Meanwhile, when the target pattern is modified by the arm motion sensor 42, the notification module 32 specifies the notification timing or notification pattern based on the modified target pattern.

Features of the above embodiments will be listed.
(1) The wearable device has a two-link mechanism in which an upper link fixed to a proximal side position of a joint of the leg and a lower link fixed to a distal side position of the joint are connected by a rotating joint positioned coaxially with the axis of rotation of the joint. In the embodiments, the left knee joint is an example of the "one joint", the thigh is an example of the "proximal side position," and the lower leg is an example of the "distal side position".
(2) The time-dependent waveform of the target pattern is identical to the time-dependent waveform of the joint angle of the healthy leg (the first leg).
(3) The walking assist device generates a target pattern which represents the time-dependent waveform of the joint angle of the healthy leg (the first leg) from leaving the ground to reaching the ground. The wearable device provided with the actuator is attached to the unhealthy leg (the other leg) and, in accordance with the target pattern, assists the motion of one step by the unhealthy leg which follows one step by the healthy leg. The walking assist device repeats the cycle of generating the target pattern from the motion of one step of the first leg, and of assisting the other leg.

Specific examples of the present invention are described above in detail, but these examples are merely illustrative and place no limitation on the scope of the patent claims. The technology described in the patent claims also encompasses various changes and modifications to the specific examples described above.

For example, instead of generating the target pattern based on the motion of the first leg, the walking assist device may store a predetermined target pattern. Further, the walking assist device 10 may assist each joint of both legs. For example, the technique taught in the present specification is also suitable for a walking training device for a user unable to move both legs normally. Using a motored wearable device attached on each leg of the user, the walking training device may adjust the joint angles of both legs of the user using the predetermined walking pattern (target pattern). The walking training device to which the present technique has been applied may notify the user the motion pattern (target pattern) of both legs prior to driving the actuator. Since the user can learn of the action of the actuator prior to its being driven, the user can use the walking assist device free from uneasiness.

The walking assist device of the embodiments uses sound to provide the user with the notifying stimulation. Instead of sound, the walking assist device may use vibration to provide the user with the notifying stimulation. Alternatively, the walking assist device may comprise a head-mount-display, and may display the waveform shown by "C" in FIG. 6 upon that display. The walking assist device may thus use sound stimulation, visual stimulation, or tactile stimulation to transmit the change pattern or notification pattern to the user.

The technical elements explained in the present specification or drawings provide technical utility either independently or through various combinations. The present invention is not limited to the combinations described at the time the claims are filed. Further, the purpose of the examples illustrated by the present specification or drawings is to satisfy multiple objectives simultaneously, and satisfying any one of those objectives gives technical utility to the present invention.

REFERENCE SIGNS LIST

10: Walking assist device
12R, 12L: Wearable device
14R, 14L: Upper link
16R, 16L: Lower link
20R, 20L: Encoder
22R, 22L: Inclination angle sensor
24R, 24L: Ground contact sensor
26: Motor
30: Controller
32: Notification module
40: Headphone
42: Arm motion sensor

The invention claimed is:

1. A walking assist device for assisting walking of a user who can move one leg but cannot move the other leg well, comprising:
   a leg motion sensor for detecting motion of the one leg;
   a wearable device attached to the other leg of the user and adjusting a joint angle of the other leg; and
   a controller configured to generate a target pattern which represents time-dependent changes of a target joint angle for the other leg from the motion of the one leg and to control the wearable device such that the joint angle of the other leg follows the target pattern, wherein
   the controller is configured to specify a change timing at which a time-dependent change of the target joint angle in the target pattern meets a predetermined condition, and to inform the user, before the specified change timing, that the change timing is arriving.

2. The walking assist device according to claim 1, wherein the controller is configured to specify a timing at which the target pattern reaches at least one of a local minimum value and a local maximum value as the change timing.

3. The walking assist device according to claim 1, wherein the walking assist device comprises an arm motion sensor for detecting motion of the user's arm, and
   the controller modifies the target pattern based on results detected by the arm motion sensor, and specifies the change timing based on the modified target pattern.

4. A walking assist device for assisting walking of a user who can move one leg but cannot move the other leg well, comprising:
   a leg motion sensor for detecting motion of the one leg;
   a wearable device attached to the other leg of the user and adjusting a joint angle of the other leg; and
   a controller configured to generate a target pattern which represents time-dependent changes of a target joint angle for the other leg from the motion of the one leg and to control the wearable device such that the joint angle of the other leg follows the target pattern, wherein
   the controller is configured to generate a notification pattern of a waveform corresponding to time-dependent changes of the target pattern, and to give the user stimulation based on the notification pattern before controlling the wearable device in accordance with the target pattern.

5. The walking assist device according to claim 4, wherein the waveform of the notification pattern is homothetic with the waveform of the time-dependent changes of the target pattern.

6. The walking assist device according to claim 1, wherein the controller is configured to specify, based on an output of the leg motion sensor, a bending timing at which a knee joint bends utmost after the one leg leaves a ground, and to inform the user, before the change timing which corresponds to the bending timing in the target pattern, that the change timing is arriving.

* * * * *

UNITED STATES PATENT AND TRADEMARK OFFICE
CERTIFICATE OF CORRECTION

PATENT NO. : 8,674,838 B2  Page 1 of 1
APPLICATION NO. : 13/126031
DATED : March 18, 2014
INVENTOR(S) : Konishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Twenty-ninth Day of September, 2015

Michelle K. Lee
*Director of the United States Patent and Trademark Office*